United States Patent
Keeney et al.

(10) Patent No.: US 6,491,291 B1
(45) Date of Patent: Dec. 10, 2002

(54) SUSPENSION CHARACTERISTIC CONTROL USING SHAPE MEMORY ALLOY MATERIALS

(75) Inventors: Chris Keeney, Troy, MI (US); Steve Yollick, Troy, MI (US); Mark Clements, Lapeer, MI (US); Joe Fader, Brighton, MI (US); Jim Hawkins, Madison, AL (US)

(73) Assignee: Meritor Light Vehicle Systems, Inc., Troy, MI (US)

( * ) Notice: Subject to any disclaimer, the term of this patent is extended or adjusted under 35 U.S.C. 154(b) by 0 days.

(21) Appl. No.: 09/566,361

(22) Filed: May 8, 2000

(51) Int. Cl.[7] ................................................. B60G 21/04
(52) U.S. Cl. ..................... 267/190; 267/64.16; 188/276
(58) Field of Search ................................. 267/186, 188, 267/189, 190, 195, 148, 64.16; 188/266.1, 266.2, 276

(56) References Cited

U.S. PATENT DOCUMENTS

| 5,005,678 | A | * | 4/1991 | Julien et al. ................. 188/378 |
| 5,061,914 | A | | 10/1991 | Busch et al. |
| 5,100,166 | A | | 3/1992 | Mitsui |
| 5,285,876 | A | | 2/1994 | Shimizu et al. |
| 5,398,785 | A | | 3/1995 | Leitmann et al. |
| 5,467,280 | A | | 11/1995 | Kimura |
| 5,727,391 | A | * | 3/1998 | Hayward et al. .............. 60/528 |
| 5,967,268 | A | * | 10/1999 | de Molina et al. .......... 188/277 |
| 5,984,283 | A | * | 11/1999 | Tsuiki et al. ............. 267/140.3 |

FOREIGN PATENT DOCUMENTS

| JP | 59-77912 A | * | 5/1984 |
| JP | 1-105035 A | * | 4/1989 |
| JP | 2-199334 A | * | 8/1990 |

* cited by examiner

Primary Examiner—Pam Rodriguez
(74) Attorney, Agent, or Firm—Carlson, Gaskey & Olds

(57) ABSTRACT

A suspension system includes a SMA suspension component, an actuator and a controller. Altering the mechanical characteristic of the SMA suspension component alters the kinematic properties of the vehicle wheel relative to the vehicle body and the suspension characteristics of the vehicle. In one disclosed embodiment a SMA suspension spring is height adjustable to alter the vehicle handling characteristics. In another disclosed embodiment a SMA suspension component stabilizer bar is shape adjustable. The SMA stabilizer bar is maintained in a first shape to provide a first handling characteristic. To provide a second handling characteristic the SMA stabilizer bar is moved into contact with a fixed vehicle component such as a vehicle frame component. The flexibility of the stabilizer bar is thereby reduced and the vehicle handling characteristics are optimized for a second condition.

4 Claims, 2 Drawing Sheets

SUSPENSION CHARACTERISTIC CONTROL USING SHAPE MEMORY ALLOY MATERIALS

BACKGROUND OF THE INVENTION

The present invention relates to a suspension system for a vehicle, and more specifically to a shape memory alloy suspension component to regulate the suspension characteristics of a vehicle.

A suspension system in a vehicle is usually provided with various suspension components, such as springs, dampers, anti-sway bars, stabilizer bars and the like which regulate the handling characteristics of the vehicle. Such suspension components are typically arranged between the vehicle wheel and vehicle body. Inherent characteristics of the components necessarily limit the suspension system to fixed properties and thus fixed handling characteristics. That is, each system has its own characteristics, which cannot be varied. This is a disadvantage when certain handling characteristics may be preferred for one road condition and not preferred for another road condition.

A particular example of this problem is provided by current sport utility vehicles which may be driven on both highway and off-road environments. The sport utility vehicle must incorporate a suspension that is applicable for each environment. Because the suspension system provides fixed characteristics, which require trade-offs that allow usage in both environments the suspension system is prevented from being optimized for either usage.

The term Shape Memory Alloys (SMA) is applied to that group of materials that demonstrate the ability to change shape, stiffness, position, natural frequency, and other mechanical characteristics in response to temperature or electromagnetic fields. Materials, both organic and metallic, possessing shape-memory, are known. An article made from such materials can be deformed from an original, heat-stable configuration to a second, heat-unstable configuration. The article is said to have shape-memory for the reason that upon application of heat alone it can be caused to revert, or attempt to revert, from its heat unstable configuration to its original heat-stable configuration, i.e., it "remembers" its original shape.

The ability to display shape-memory is a result of the fact that the alloy undergoes a reversible transformation from an austenitic state to a martensitic state with a change in temperature. An article made from such an alloy is easily deformed from its original configuration to a new configuration when cooled to a temperature below which the alloy is transferred from the austenitic state to the martensitic state.

Although a relatively wide variety of alloys are know to exhibit the shape memory effect, preferred are those that can recover substantial amounts of strain or that generate significant force upon changing shape. The best known and most readily available SMA is Nitinol, an alloy of nickel and titanium. Other such SMAs are nickel-titanium alloys and copper-base alloys such as CuZnAl and CuAlNi.

Actuators have heretofore been developed which employ shape-memory alloys or materials. However, such materials and alloys have not been incorporated into suspension systems.

It is therefore desirable to provide shape memory alloy suspension component to allow the suspension characteristics of a vehicle to be regulated.

SUMMARY OF THE INVENTION

The Shape Memory Alloy (SMA) suspension system according to the present invention generally includes a SMA suspension component, an actuator and a controller. It is known that SMAs respond to a shift in temperature above and below a phase transformation temperature to actuate or change a mechanical property of the SMA. The particular mechanical characteristic of the SMA suspension component, such as shape, stiffness, position, natural frequency, can therefore be altered. Altering the mechanical characteristic of the SMA suspension component thereby alters the kinematic properties of the vehicle wheel relative to the vehicle body and the suspension characteristics of the vehicle.

To alter the SMA suspension component, the present invention attaches an actuator to the vehicle body in the vicinity of the SMA component. The actuator referably generates heat, an electromagnetic field or electric current to shift the SMA component temperature above or below a phase transformation temperature to actuate or change a mechanical characteristic of the SMA suspension component in a known manner. Preferably, a controller is in communication with the actuator. The controller controls the actuators automatically based upon sensors which communicate with the SMA suspension components or alternatively or additionally by manual input from the driver.

In one disclosed embodiment a SMA suspension component spring is illustrated. The spring is manufactured of SMA such that the adjustable mechanical characteristic is the spring height. Changing the spring height thereby alters the vehicle handling characteristics.

In another disclosed embodiment a SMA suspension component stabilizer bar is illustrated. The stabilizer bar is manufactured of SMA such that the adjustable mechanical characteristic is the shape of the stabilizer bar. In the disclosed embodiment, the SMA stabilizer bar is maintained in a first shape which clears the vehicle frame. The function of the stabilizer bar is substantially removed and the vehicle handling characteristics are optimized for a first condition such as an off-road environment. The off-road performance is thereby improved as the suspension articulation and traction are increased by reducing the function of the stabilizer bar.

When the SMA characteristics of the stabilizer bar are inactivated the stabilizer bar shape is expanded to contact a fixed vehicle component such as a vehicle frame component. By bringing the stabilizer bar into contact with the frame, the flexibility of the stabilizer bar is reduced and the vehicle handling characteristics are optimized for a second condition such as an on-road environment.

The SMA suspension components according to the present invention thereby allows the suspension characteristics of a vehicle to be changed to suit desired handling and environment conditions.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
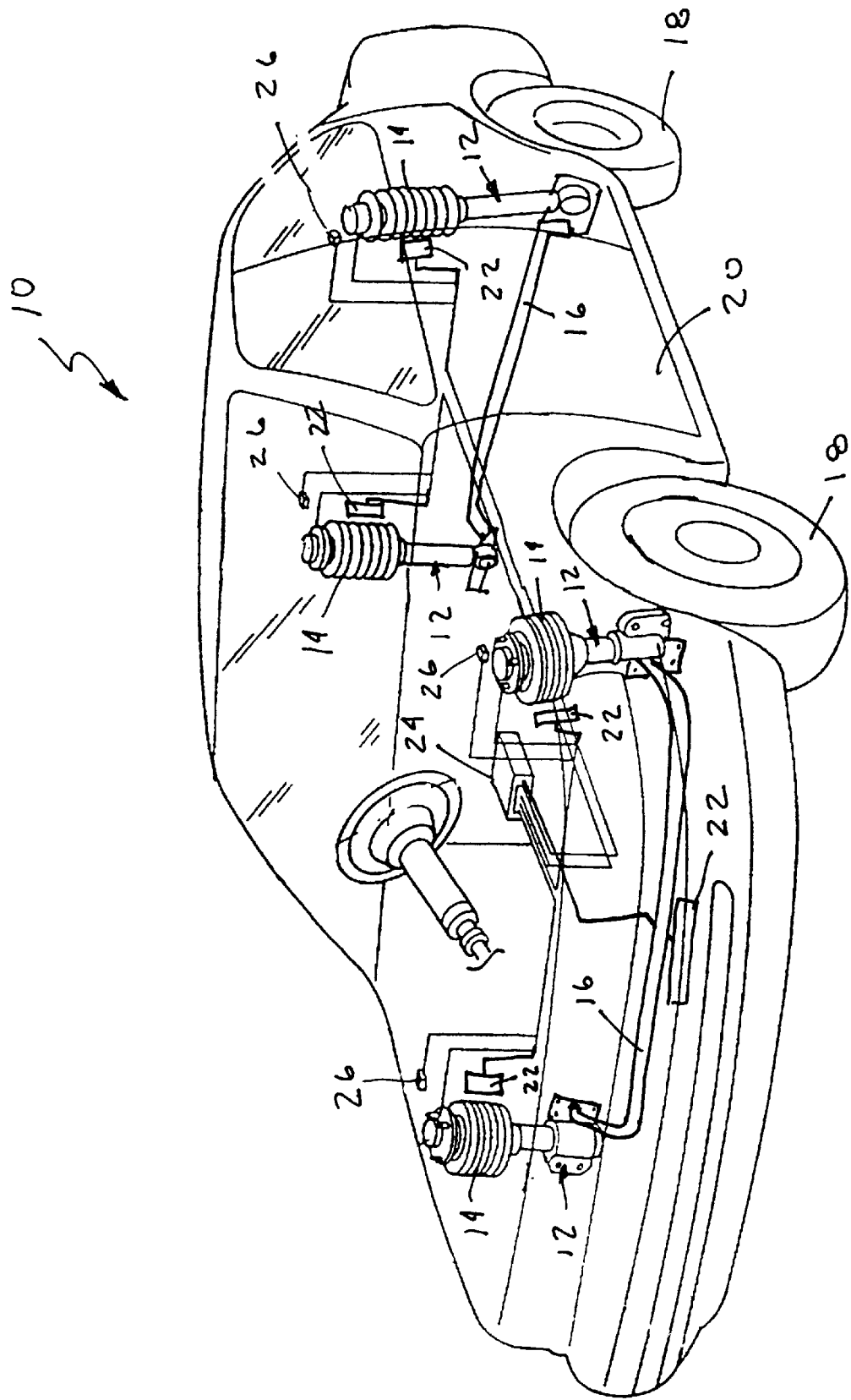
FIG. 1 is a general phantom view of a vehicle illustrating a SMA suspension system according to the present invention.

FIG. 1 illustrates a perspective view of a vehicle 10. The vehicle 10 employs various Shape Memory Alloy (SMA) suspension components such as, for illustrative purposes only, a shock absorber 12 having, a SMA spring 14, and a SMA stabilizer bar 16. It will be understood that the SMA springs 14 and SMA stabilizer bars 16 are used in this specification for clarity and illustration purposes only and the present invention cannot be considered limited to only these suspension components.

Each shock absorber 12 is provided in conjunction with a SMA spring 14 and is attached to a vehicle wheel 18 in a known manner allowing each wheel 18 to move relative to the vehicle body 20. The SMA stabilizer bar 16 is connected between the two front wheels 18 of the vehicle 10 and alternatively or additionally a second SMA stabilizer bar 16 may be connected between the rear wheels in a known manner.

The SMA suspension components regulate the movement of each wheel 18 relative to the vehicle body 20. Such regulated movement is based on the particular mechanical characteristic such as shape, stiffness, position, natural frequency and the like. The mechanical characteristic of the SMA suspension component define the static and dynamic properties of the wheel 18 relative to the vehicle body 20. As will be further described below, the properties of the particular SMA suspension component can be varied to regulate movement of the vehicle wheel 18 relative to the vehicle body and thereby alter the suspension characteristics and handling of the vehicle 10.

It is known that SMAs respond to a shift in temperature above and below a phase transformation temperature to actuate or change a mechanical property of the SMA, such as shape, stiffness, position, natural frequency, and other mechanical characteristics. To alter the mechanical characteristics of the SMA suspension component, the present invention provides an actuator 22 adjacent the SMA component. The actuator 22 preferably generates heat, an electromagnetic field or electric current to alter the mechanical characteristic of the SMA suspension component in a known manner.

A controller 24 is preferably in communication with the actuator 22. The controller 24 preferably operates each of a plurality of actuators to alter the mechanical properties of the SMA suspension components to thereby alter the handling characteristics of the vehicle 20. The controller 24 may control the actuators 22 automatically based upon sensors 26 which communicate with the SMA suspension components or alternatively or additionally by manual input from the driver.

In a manual mode the driver selects the desired handling characteristics of the vehicle and the controller 24 alters the mechanical properties of the SMA suspension components to provide the desired handling characteristics. In an automatic adjustment method, the controller 24 communicates with the sensors 26 to identify movement of the suspension system based on input to the sensors 26, such as road conditions, motion of the suspension, or the like. The controller 24 identifies the environment the suspension system is currently operating upon and automatically adjusts the SMA suspension component. The suspension system is thereby automatically tuned to optimize the handling characteristics of the vehicle.

Figure 2:
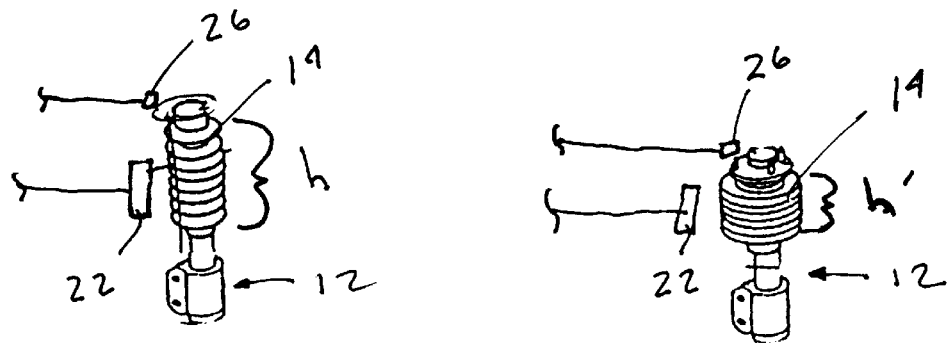
FIG. 2 is an expanded view of a SMA suspension spring.

Referring to FIG. 2, a SMA suspension component, such as spring 14 is illustrated. The spring 14 is manufactured of SMA such that the adjustable mechanical characteristic is the spring height (h). It will be understood that other mechanical characteristics such as stiffness are also encompassed within the present invention. In the disclosed embodiment, the spring height is predefined for general usage on multiple road conditions. For example only, the height of the spring 14 can be normally of a height h. The vehicle handling characteristics are thereby optimized for a first condition such as general purpose driving. However, because Nitinol retracts when exposed to heat, activation of the SMA characteristics by the actuator 22 causes the spring 14 to be reduced to height h'. The spring 14 of reduced height h' provides a stiffened response. The vehicle handling characteristics are thereby optimized for a second condition such as high-speed driving. The activation can be selected manually or automatically as described above.

Figure 3:
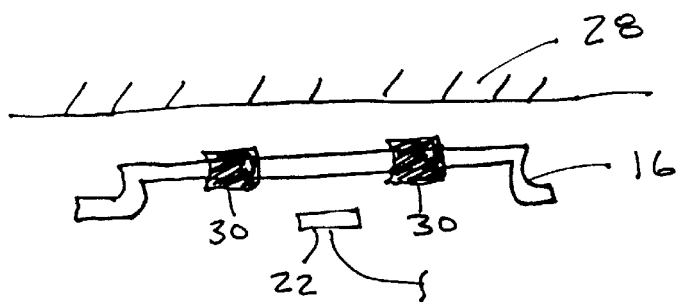
FIG. 3 is an expanded view of a SMA suspension stabilizer bar in a first condition to provide a first vehicle handling characteristic.

Referring to FIG. 3, a SMA suspension component, such as stabilizer bar 16 is illustrated from the front of the vehicle 10. The stabilizer bar 16 is manufactured of SMA such that the adjustable mechanical characteristic is the shape of the stabilizer bar. It will be understood that other mechanical characteristics are encompassed within the present invention such as, for example only, stiffness. In the disclosed embodiment when the SMA is activated by the actuator 22 the stabilizer bar 16 is of a first shape which clears the vehicle frame 28. The vehicle handling characteristics are thereby optimized for a first condition such as an off-road environment.

Figure 4:
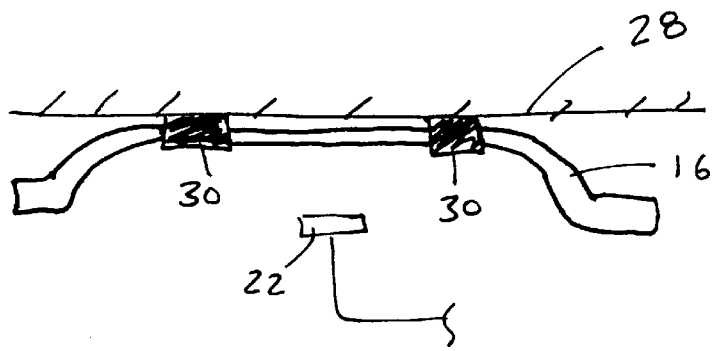
FIG. 4 is an expanded view of the SMA suspension stabilizer bar of FIG. 3 in a second condition to provide a second vehicle handling characteristic.

Referring now to FIG. 4, however, the SMA characteristics of the stabilizer bar 16 are inactivated and the stabilizer bar 16 shape expands and is redefined to contact a fixed vehicle component such as a vehicle frame component 28. Preferably, bushings 30, or the like provide a cushion between the frame 28 and stabilizer bar 16. By bringing the stabilizer bar 16 into contact with the frame 28, the flexibility of the stabilizer bar 16 is reduced and the vehicle handling characteristics are optimized for a second condition such as an on-road environment. The activation can be selected manually or automatically as described above.

These particular applications are only examples. Many other applications would be apparent to a worker in this art. Any suspension component that would desirably have two sets of characteristics for different conditions would benefit from this invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A suspension system for a vehicle comprising:
   a shape memory alloy stabilizer bar which defines a mechanical characteristic to regulate a kinematic property of a wheel relative to a vehicle body, said shape memory alloy stabilizer bar respondable to a shift in temperature above and below a phase transformation temperature such that said shape memory alloy stabilizer bar has a first mechanical characteristic to provide a first kinematics property above said phase transformation temperature and a second mechanical characteristic below said phase transformation temperature to provide a second kinematics property; said second mechanical characteristic comprising contacting said bushing against a fixed component; and a bushing mounted to said shape memory alloy stabilizer bar.

2. A suspension system for a vehicle comprising:

a shape memory alloy stabilizer bar which defines a mechanical characteristic to regulate a kinematic property of a wheel relative to a vehicle body, said shape memory alloy stabilizer bar respondable to a shift in temperature above and below a phase transformation temperature such that said shape memory alloy stabilizer bar has a first mechanical characteristic to provide a first kinematics property above said phase transformation temperature and a second mechanical characteristic below said phase transformation temperature to provide a second kinematics property; and a bushing mounted along a longitudinal length of said shape memory alloy stabilizer bar, said first mechanical characteristic comprising a clearance between said bushing and a fixed component, and said second mechanical characteristic comprising selective contact between said bushing and a fixed component.

3. A suspension system for a vehicle comprising:

a shape memory alloy stabilizer bar which defines a mechanical characteristic to regulate a kinematic property of a wheel relative to a vehicle body, said shape memory alloy stabilizer bar respondable to a shift in temperature above and below a phase transformation temperature such that said shape memory alloy stabilizer bar has a first mechanical characteristic to provide a first kinematics property above said phase transformation temperature and a second mechanical characteristic below said phase transformation temperature to provide a second kinematics property; and a bushing mounted to said shape memory alloy stabilizer bar said bushing mounted along a longitudinal length of said shape memory alloy stabilizer bar.

4. A suspension system for a vehicle comprising:

a shape memory alloy stabilizer bar which defines a mechanical characteristic to regulate a kinematic property of a wheel relative to a vehicle body, said shape memory alloy stabilizer bar respondable to a shift in temperature above and below a phase transformation temperature such that said shape memory alloy stabilizer bar has a first mechanical characteristic to provide a first kinematics property above said phase transformation temperature and a second mechanical characteristic below said phase transformation temperature to provide a second kinematics property;

a first bushing mounted to said shape memory alloy stabilizer bar; and a second bushing, and said first bushing mounted along a longitudinal length of said stabilizer bar, said second mechanical characteristic includes flexing said stabilizer bar between said first bushing and said second bushing.

* * * * *

UNITED STATES PATENT AND TRADEMARK OFFICE
CERTIFICATE OF CORRECTION

PATENT NO.     : 6,491,291 B1
DATED          : December 10, 2002
INVENTOR(S)    : Keeney et al.

It is certified that error appears in the above-identified patent and that said Letters Patent is hereby corrected as shown below:

Column 5,
Line 10, after "comprising" insert -- selectively --.

Signed and Sealed this

Sixth Day of May, 2003

JAMES E. ROGAN
*Director of the United States Patent and Trademark Office*